United States Patent [19]
Kälin et al.

[11] Patent Number: 5,564,674
[45] Date of Patent: Oct. 15, 1996

[54] VALVE ACTUATED BY ITS OWN MEDIUM

[75] Inventors: Rudolf Kälin; Bruno Thomann, both of Winterthur; Edelbert Tiefenthaler, Elgg, all of Switzerland

[73] Assignee: Sulzer Thermtec AG, Winterthur, Switzerland

[21] Appl. No.: 575,534

[22] Filed: Dec. 20, 1995

[30] Foreign Application Priority Data

Feb. 13, 1995 [EP] European Pat. Off. .......... 95810092

[51] Int. Cl.$^6$ .................. F16K 31/44; F16K 31/72
[52] U.S. Cl. .............................. 251/38; 251/282
[58] Field of Search .................. 251/38, 282, 33, 251/25, 30.04

[56] References Cited

U.S. PATENT DOCUMENTS

| | | | |
|---|---|---|---|
| 3,405,906 | 10/1968 | Keller | 251/30.04 |
| 3,612,476 | 10/1971 | Leitgeb | 251/38 |
| 4,746,093 | 5/1988 | Scanderbeg | 251/282 X |
| 4,779,837 | 10/1988 | Mito et al. | 251/38 X |
| 4,997,159 | 3/1991 | Yoshino et al. | 251/38 X |

FOREIGN PATENT DOCUMENTS

| | | |
|---|---|---|
| 0195206 | 9/1986 | European Pat. Off. . |
| 814978 | 9/1951 | Germany . |
| 395672 | 7/1965 | Switzerland . |

*Primary Examiner*—Kevin Lee
*Attorney, Agent, or Firm*—Townsend and Townsend and Crew

[57] ABSTRACT

The valve comprises a first pressure chamber (2), an outlet chamber (6) and a valve body (8), cooperating with a first valve seat (12), and also a second pressure chamber (13) delimited by the valve body. The valve body (8) comprises a control piston (22) which cooperates with a second valve seat (26) and is movable between a closing position and an open position. The control piston delimits in a valve chamber (17) a first sub-chamber, which faces away from the second valve seat (26) and communicates with the first pressure chamber (2), a second sub-chamber, which faces the second valve seat (26) and communicates with the outlet chamber (6), and a middle sub-chamber, which surrounds the cylindrical surface of the control piston and communicates with the second pressure chamber (13). The control piston (22) establishes in the closing position transfer communication between the first and the middle sub-chamber, and in the open position transfer communication between the second and the middle sub-chamber. The valve body (8), which is designed as an equalizing piston, adjusts itself always like a follower piston with respect to the control piston (22) which may be driven by a controllable positioner (19), and is controllably displaceable thereby between the first valve seat (12) and the various open positions.

13 Claims, 2 Drawing Sheets

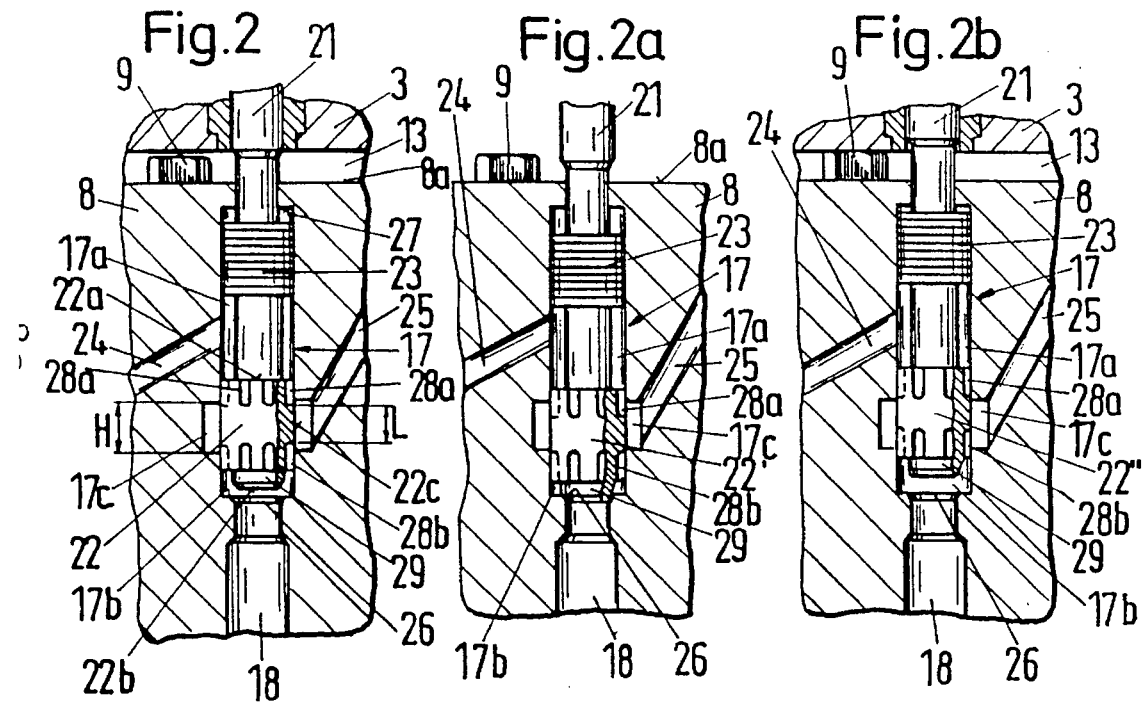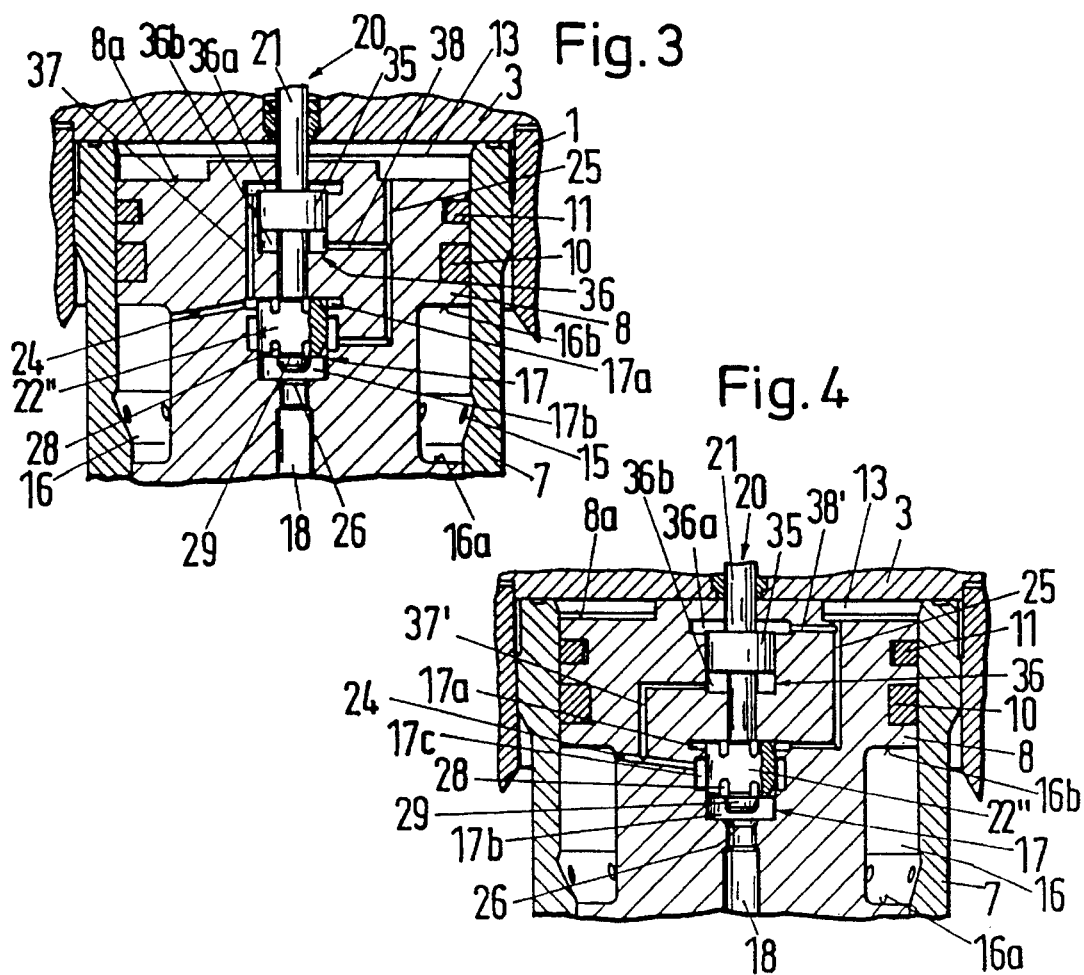

VALVE ACTUATED BY ITS OWN MEDIUM

The invention relates to a pre-controlled valve actuated by its own medium according to the preamble of claim 1.

A valve of this type is known from EP-A 0 195 206. This valve is often used for the control of safety systems, for instance, for steam generators where the behaviour as regards opening and closing, particularly the speed with which it responds to control signals, is of decisive importance. The valve body of the known valve is displaceable by means of an electromagnet between an open position and a closing position. However, the known design is not suitable for a differentiated controlled opening and/or closing movement of the valve body.

The aim of the invention is to devise a valve of the above-mentioned type, developed further particularly in this respect, in a simple embodiment which enables desired influencing of the opening and closing movement of the valve body and thereby the use of such a valve as a control valve by means of which the pressure medium, e.g. steam or water, may be relieved from a high pressure to a lower pressure.

This aim is achieved, according to the invention, by the characterising features of claim 1.

In a valve according to the invention the valve body, designed as an equalizing piston, is displaceable by means of a guide member in the sense of a servo-control between the closing position and a position of maximum opening, and within its lift region may be set in any desired intermediate positions. The valve body may be retained in any intermediate position in the manner of a follower piston relative to the control piston always in an equalizing position in which the middle sub-chamber of the valve chamber is substantially closed with respect to the first sub-chamber and the second sub-chamber, and the connection between the first pressure chamber and the second pressure chamber is thereby interrupted. Particularly a simple regulation of the pressure built up in the second pressure chamber is achievable with this embodiment, this being the pressure which acts on the end portion of the valve body facing away from the first valve seat and which is influenced in every intermediate position of the valve body and during every displacement movement of the control piston by a corresponding relative movement of the valve body with respect to the control piston, automatically in the sense of equalization of pressures and flow forces acting on the valve body. In the embodiment according to the invention the displacement of the valve body requires advantageously smaller displacement forces which may be exerted by a relatively small, cheap and universally applicable actuating drive.

Embodiments of the invention are disclosed in the dependent claims.

Further features and details will be apparent from the following description, by way of example, of embodiments of the invention, diagrammatically illustrated in the drawing, in which:

FIG. 2 shows a detail of the valve according to FIG. 1 in a larger representation;

FIGS. 2a and 2b show the detail according to FIG. 2 in another working position; and FIGS. 3 and 4 show further details of valves according to a modified embodiment.

Figure 1:
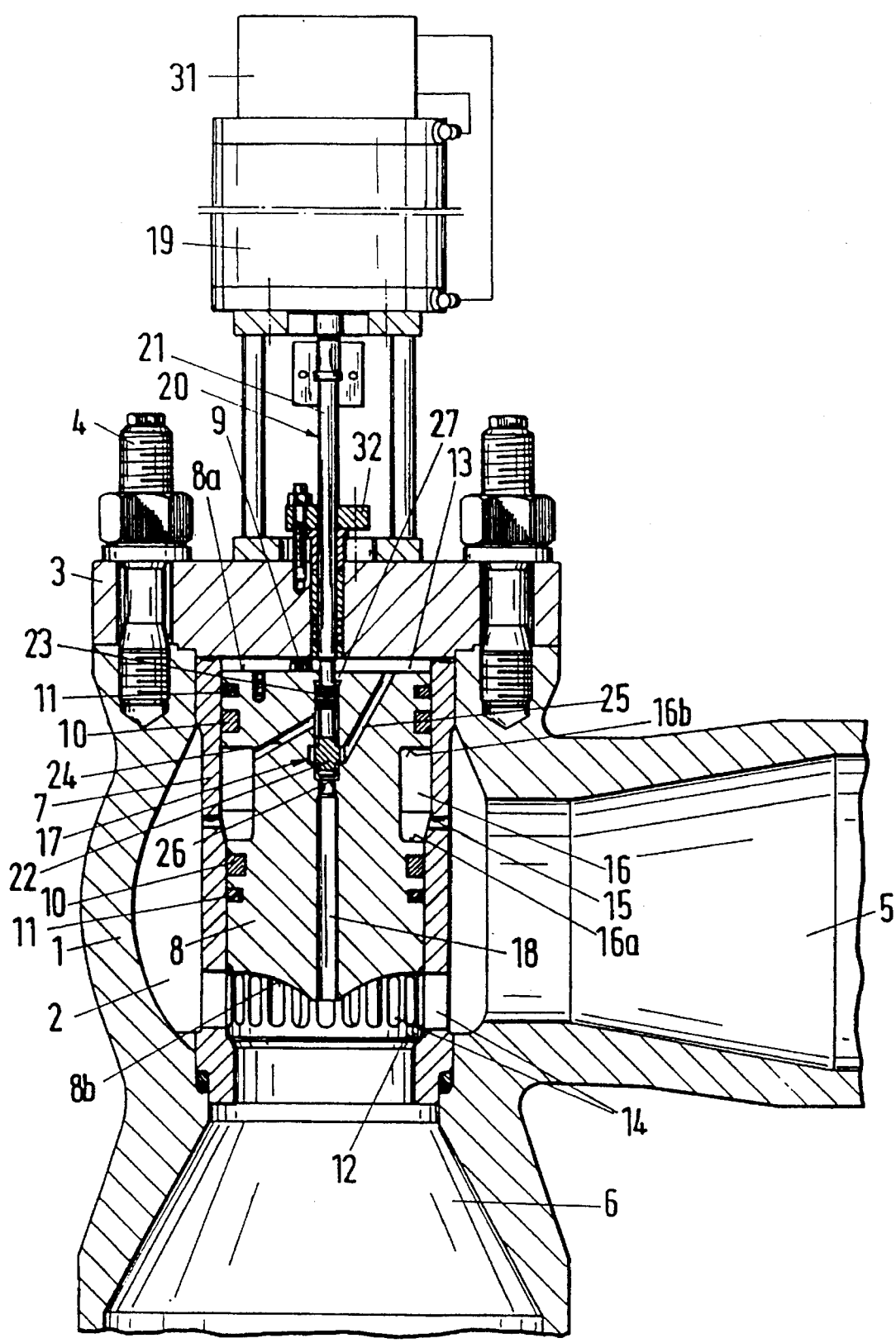
FIG. 1 is a longitudinal section through a valve according to the invention provided with a positioner.

A valve according to FIG. 1, which is actuated by steam as its own pressure medium, comprises a housing 1 which contains a first pressure chamber 2 and a lid 3 which is fixed by bolts 4 on a shoulder of the housing 1. The pressure chamber 2 communicates by means of a horizontal inlet port 5 with an inlet pipe (not shown) and by means of an outlet chamber 6 and a vertical outlet port with an outlet pipe (not shown) for the pressure medium. In the housing 1 is situated a sleeve 7 which extends through the pressure chamber 2 and in which is slidably guided, coaxially with the outlet port, a valve body 8 by means of guide rings 10 and piston rings 11. In the sleeve 7, in the region of transition between the first pressure chamber 2 and the outlet chamber 6, is made an annular first valve seat 12 with which cooperates the valve body 8. The valve body 8 is displaceable between a closing position, delimited by the valve seat 12, and a position of maximum opening delimited by the lid 3. Its end portion 8a, facing away from the valve seat 12, cooperates with the lid 3 through a projecting stop element 9 (in the illustration a screw head) and delimits with the lid and with the wall of the sleeve 7 a second pressure chamber 13 at the end face. The valve body 8 is made as an equalizing piston, and its end portion 8a (the upper one in the illustration) has a larger piston face than the end portion 8b facing the valve seat 12.

The sleeve 7 is provided in a longitudinal portion situated upstream from, and adjacent to, the valve seat 12 with several passages for the pressure medium which are distributed around its circumference (illustrated in the form of slots 14) and extend across the lift region of the end portion 8b of the valve body 8 cooperating with the valve seat 12. As a consequence, a defined, continuous or step-wise change of the cross-sectional area of the valve through which flows the pressure medium is obtainable during every lift. In a middle longitudinal portion of the sleeve 7 are provided further passages which are distributed around its circumference and have the form of bores 15 which provide communication between an annular space 16, which is provided on the periphery of the valve body 8, is surrounded by the sleeve 7 and extends during every lift of the valve body 8 across the bores 15, and thus permanently communicates with the first pressure chamber 2. The annular space 16 is delimited with respect to the outlet chamber 6 by a lower annular surface 16a, and with respect to the pressure chamber 13 by an upper (in the illustration larger) annular surface 16b, through which upwardly directed pressure acts on the valve body 8.

In the valve body 8 is provided a valve chamber 17 which communicates through an axial bore 18 in the valve 8, which is open towards the lower end portion 8b, with the outlet chamber 6 of the housing 1. In the valve chamber 7 is provided a guide member 20, which is displaceable coaxially to the valve body 8 and which contains a piston rod 21, which may be coupled to the actuating device 19. On the piston rod are arranged a control piston 22 and a sealing piston 23 which is spaced from the control piston and which movably seals the valve chamber 17 with respect to the second pressure chamber 13. As is apparent particularly from FIGS. 2, 2a and 2b, the control piston 22 cooperates with a second valve seat 26 situated between the valve chamber 17 and the bore 18, and delimits in the valve chamber 17, by its first piston face 22a facing the second pressure chamber 13, a first sub-chamber 17a, by its second piston face 22b facing the second valve seat 26, a second sub-chamber 17b, and, by its cylindrical surface 22c, a middle sub-chamber 17c which is made in the form of an annular groove which locally widens the valve chamber 17. The first sub-chamber 17a is connected through a first connection channel 24 to the annular space 16 which communicates with the first pressure chamber 2, the second sub-chamber 17b is connected, through the bore 18, which communicates with it permanently, with the outlet chamber 6 of the housing 1, while the middle sub-chamber 17c is permanently connected, through a second connection channel 25, to the second pressure chamber 13 at the end face.

The control piston 22 is in the valve chamber 17 displaceably guided between a first end position 22' (FIG. 2a), which is delimited by the second valve seat 26 and in which an attachment part 29 made on the piston face 22b closes the valve seat 26, and a second end position 22' (FIG. 2b), which is nearer the second pressure chamber 13 and is in the illustration delimited by a stop 27 for the sealing piston 23. As is further apparent from FIGS. 2, 2a and 2b, the control piston 22 has a middle longitudinal portion which is associated with the middle sub-chamber 17c and may be sealingly pressed on the walls of the first sub-chamber 17a and the second sub-chamber 17b. The middle longitudinal portion is, at both ends, delimited by end portions provided respectively with transfer channels in the form of longitudinal grooves 28a and 28b extending in axial direction. The middle longitudinal portion of the control piston 22, which is free from longitudinal grooves 28a and 28b, has (according to the illustration) an axial dimension L which is by a certain undermasking dimension smaller than the corresponding axial dimension H of the middle sub-chamber 17c. Also an embodiment is possible, in which the middle portion of the piston and the middle sub-chamber 17c have at least approximately equal axial dimensions L and H.

The control piston 22 is displaceable by means of the actuating device 19 between an upper lift position, which is illustrated in FIGS. 1 and 2 and corresponds to a controlled open position of the valve body 8, and a lowermost lift position which is not illustrated and which corresponds to the closing position of the valve body 8. In the closing position of the valve body 8 the control piston 22 assumes the first end position 22' (FIG. 2a) in which the longitudinal grooves 28a establish a transfer communication between the sub-chambers 17a and 17c and thereby a correspondingly throttled supply of the pressure medium from the first pressure chamber 2 to the second pressure chamber 13 in which a correspondingly reduced pressure is produced. By this pressure, which acts on the upper end portion 8a, the valve body 8 is pressed by its lower end portion 8b onto the valve seat 12.

In the position of maximum opening of the valve body 8, which is determined by the stop on the lid 3, the control piston 22 assumes the second end position 22" (FIG. 2b) in which the longitudinal grooves 28a are kept outside the sub-chamber 17c, the supply of pressure medium is blocked and the second valve seat 26 is freed. In this situation a transfer communication is established through the longitudinal grooves 28b between the sub-chambers 17c and 17b and thereby between the second pressure chamber 13 and the outlet chamber 6, so that the pressure medium can flow out from the second pressure chamber 13, and the valve body 8 is held in the position of maximum opening substantially by the pressure of the pressure medium acting on the upper end portion 8b and on the upper annular surface 16b.

Corresponding transfer communication between the sub-chambers 17c and 17a or 17b may be provided also in another way, e.g. by end portions (not shown) of the control piston 22 which are conically tapered in the provided transfer regions, or by bores made in the control piston 22 which in the relevant end position 22' or 22" arrive to the region of the middle sub-chamber 17c.

As the actuating device 19 may be provided a pneumatic positioner which may contain a controller 31 which may be actuated, e.g. in dependence on electric control signals, and by means of which the control piston 22 is continuously or in steps displaceable within the displacement region corresponding to the region of lift of the valve body 8, and may be guided so as to stop in any desired intermediate positions. Due to the above described design of the control piston 22 and the valve chamber 17, the valve body 8 is pre-controlled in the manner of a follower piston, while the pressure in the upper pressure chamber 13 is so controlled, that on the valve body 8 acts, in any intermediate position determined by the setting of the control piston 22, a pressure which acts through the upper end portion 8a and which corresponds to the upwardly directed pressures acting through the lower end portion 8b and the upper annular surface 16b.

The valve body 8 is therefore always kept in an equalizing position according to Fig. 2 in which the valve chamber 17 contains the control piston 22 in a middle position, which sets itself between its both end positions 22' and 22" and in which the middle sub-chamber 17c is substantially closed by the middle longitudinal portion of the control piston 22 and is separated from the adjacent sub-chambers 17a and 17b, so that the connection between the first pressure chamber 2 and the second, upper pressure chamber 13 is interrupted. A small leakage flow can occur in the illustrated embodiment in this equalizing position between the sub-chambers 17c and 17a or 17b due to the above mentioned undermasking with respect to the middle sub-chamber 17c which takes place in the region of the middle longitudinal portion of the control piston 22. Due to this, the danger of pressure shocks caused by displacement of the valve body 8 may be reduced.

Every lifting of the control piston 22 causes a corresponding displacement movement of the valve body 8. During the displacement of the control piston 22 with respect to the valve seat 26 is established communication between the sub-chambers 17a and 17c and therefore between the annular space 16 and the upper pressure chamber 13. As a consequence, pressure is built up in the pressure chamber 13 by which the valve body 8 tracks the control piston 22 and finally—by the pressure forces and flow forces acting against each other—in the equalizing position according to FIG. 2, in which the connection between the sub-chambers 17a and 17c is interrupted. During displacement of the control piston 22 towards the upper pressure chamber 13 is established communication between the sub-chambers 17c and 17b and therefore between the pressure chamber 13 and the outlet chamber 6, so that the pressure medium may be forced out of the pressure chamber 13, and the valve body 8 in a corresponding lifting movement tracks the control piston 22 and is finally kept in the equalizing position.

The displacement of the valve body 8 requires advantageously only small displacement forces which result substantially from a spindle lifting force, introduced through the second (lower) piston face 22b to the control piston 22, and a frictional force acting on the piston rod 21 in the region of a seal arrangement in the lid 3, in the illustration a stuffing box 32. The valve made according to the invention enables a relatively small, inexpensive, universally applicable positioning drive to be used which is largely independent on the pressure in the valve, and may be produced in an embodiment suitable for valves with various dimensions, e.g. with valve seat diameters of 100 mm to 500 mm and with various fields of application.

The parts which correspond to each other have in the embodiments described by way of example the same reference numerals. According to the embodiments shown in FIGS. 3 and 4 the guide member 20 may have a servo-piston 35 which is spaced from the control piston 22 and which is guided in the valve body 8 in an equalizing chamber 36 screened from the valve chamber 17 and delimits in it an upper cylinder space 36a, facing the second pressure chamber 13, and a lower cylinder space 6b facing the control piston 22. In the embodiment according to FIG. 3, the upper cylinder space 36a communicates through a first channel 37 with the first sub-chamber 17a of the valve body 17 which is correspondingly orientated and communicates with the first pressure chamber 2, and the lower cylinder space 36b communicates through a second channel 38 with the second connection channel 25 interconnecting the middle sub-chamber 17c and the second pressure chamber 13. When the control piston 22 assumes the illustrated second, upper end position 22" the upper cylinder space 36a communicates, in this embodiment, with the first pressure chamber 2, while on the valve body 8 acts a displacement force directed towards the upper pressure chamber 13 by which is overcome possible blocking of the valve body 8, e.g. after a lengthy stay of the valve body 8 in the closing position or in a certain middle lifting position, and a reliable opening of the valve may be ensured.

In the embodiment according to FIG. 4 the first connection channel 24 communicates with the middle sub-chamber 17c, and through a channel 37' with the lower cylinder space 36b, while the second connection channel 25 communicates with the upper sub-channel 17a, and through a channel 38' with the upper cylinder space 36a. As a consequence, in the illustrated upper end position 22" of the control piston 22, the upper, second pressure chamber 13 communicates through the connection channel 25 with the upper sub-chamber 17a closed with respect to the middle sub-chamber 17c, while the middle sub-chamber 17c, which communicates with the lower sub-chamber 17b, communicates through the annular space 16 with the first pressure chamber 2, and through the bore 18 with the outlet chamber 6. The valve body 8 is held in the illustrated position of maximum opening substantially by the pressure in the first pressure chamber 2 which acts on the lower end portion 8b and the upper annular surface 16b. If the control piston 22 is moved towards the second valve seat 26, so as to start a closing movement, the upper pressure chamber 13 and the upper cylinder space 36a are connected, through the upper sub-chamber 17a, with the first pressure chamber 2, while the control piston 22 is pressed, by means of the servo-piston 35 acted upon through the cylinder space 36a, by an additional displacement force, onto the second valve seat 26, whereby a reliable closure of the valve is ensured.

THE DESCRIPTION OF THE INVENTION COULD BE SUMMARIZED AS FOLLOWS

The valve comprises a first pressure chamber 2, an outlet chamber 6 and a valve body 8 which cooperates with a first valve seat 12 and is designed as an equalizing piston, and also a second pressure chamber 13 delimited by the valve body. The valve body 8 comprises a control piston 22 which cooperates with a second valve seat 26 and is movable between a first closing position and an open position. The control piston delimits in a valve chamber 17 a first sub-chamber facing away from the second valve seat 26 and communicating with the first pressure chamber 2, a second sub-chamber facing the second valve seat 26 and communicating with the outlet chamber 6, and a middle sub-chamber, which surrounds the cylindrical surface of the control piston and communicates with the second pressure chamber 13. The control piston 22 establishes in the closing position a transfer connection between the first and the middle sub-chamber, and in the open position a transfer connection between the second and the middle sub-chamber. The valve body 8 adjusts itself always in the manner of a follower piston with respect to the control piston 22, which can be driven by means of a controllable positioner 19, and is by the control piston controllably displaceable between the first valve seat 12 and various open positions.

Also another, e.g. a hydraulic or electromechanical, positioner may be used instead of the illustrated pneumatic positioner 19.

We claim:

1. A pre-controlled valve actuated by its own medium, which comprises a housing, through which flows a pressure medium, which comprises a first pressure chamber (2), an outlet chamber (6) and a first valve seat (12), and which contains a valve body (8) cooperating with the first valve seat and a second pressure chamber (13) which is delimited by a piston face (8a) of the valve body (8) facing away from the valve seat (12), wherein the valve body (8) comprises a valve chamber (17) with a second valve seat (26) and contains a control piston (22) which cooperates with the second valve seat, may be driven by a driving medium, and is movably guided between a closing position (22') and an open position (22"), characterised in that the valve body (8) is made as an equalizing piston, that the control piston (22) delimits in the valve chamber (17) a first sub-chamber (17a), which faces away from the second valve seat (26) and communicates with one of the pressure chambers (2 or 13), a second sub-chamber (17b), which faces the second valve seat (26) and communicates with the outlet chamber (6), and a middle sub-chamber (17c), which surrounds the cylindrical surface (22c) of the control piston and communicates with the other pressure chamber (13 or 2), and that in the closing position (22') of the control piston (22) is established transfer communication between the first sub-chamber (17a) and the middle sub-chamber (17c), and in the open position (22") is established transfer communication between the second sub-chamber (17b) and the middle sub-chamber (17c).

2. A valve according to claim 1, characterised in that the transfer communications are formed by transfer channels provided on the control piston (22).

3. A valve according to claim 2, characterised in that the control piston (22) has a middle piston portion for cooperation with the first sub-chamber (17a) and the second sub-chamber (17b) on whose walls it may sealingly bear, which is at both ends delimited by end portions in which are made transfer channels for cooperation with the middle sub-chamber (17c), the transfer channels being in the form of grooves (28a, 28b) extending substantially in axial direction.

4. A valve according to claim 3, characterised in that the middle piston portion has an axial dimension (L) which is smaller than a corresponding axial dimension (H) of the middle sub-chamber (17c).

5. A valve according to claim 1, characterised in that the valve body (8) is guided in a sleeve (7) which passes through the first pressure chamber (2) of the housing, which contains the first valve seat (12) and which is provided in a longitudinal portion, which is adjacent to it and corresponds to a predetermined lift region of the valve body (8), and also in the region of an annular space (16), which is made on the valve body (8) and communicates with the valve chamber (17), with passages (14, 15) for the pressure medium.

6. A valve according to claim 1, characterised in that the control piston (22) is coupled with a servo-piston (35) which is guided in a equalizing chamber (36) of the valve body (8), which is screened from the valve chamber (17) and delimits in the equalizing chamber two cylinder spaces (36a, 36b) of which one communicates with the first pressure chamber (2) of the housing and the other with the second pressure chamber (13).

7. A valve according to claim 6, characterised in that each of the cylinder spaces (36a, 36b) of the equalizing chamber (36) and each of the sub-chambers (17a or 17b) of the valve chamber (17) are connected through a common connection channel (24 or 25) to the associated pressure chamber (2 or 13).

8. A valve according to claim 1, characterised in that the first sub-chamber (17a) of the valve body (8) is connected through a first connection channel (24) to the first pressure chamber (2) of the housing, and that the middle sub-chamber (17c) is connected through a second connection channel (25) to the second pressure chamber (13).

9. A valve according to claim 1 characterised in that the middle sub-chamber (17c) of the valve body (8) is connected through a first connection channel (24) to the first pressure chamber (2) of the housing, and that the first sub-chamber (17a) is connected through a second connection channel (25) to the second pressure chamber (13).

10. A valve according to claim 1, characterised in that a controllable actuating device (19) is provided as the driving means for the control piston (22) by means of which the control piston (22) is displaceable within a defined lifting length which corresponds to a lifting region of the valve body (8), and may be held in at least one intermediate position.

11. A valve according to claim 10, characterised in that the actuating device (19) is a pneumatic positioner.

12. A valve according to claim 10, characterised in that the actuating device (19) is connected to a controller (31), which may be influenced in dependence on electric control signals, and is displaceable by it in steps.

13. Use of a valve according to claim 1 as a displaceable control valve for relieving a pressure medium, e.g. steam or water, from a high pressure to a lower pressure.

* * * * *